Patented Mar. 24, 1925.

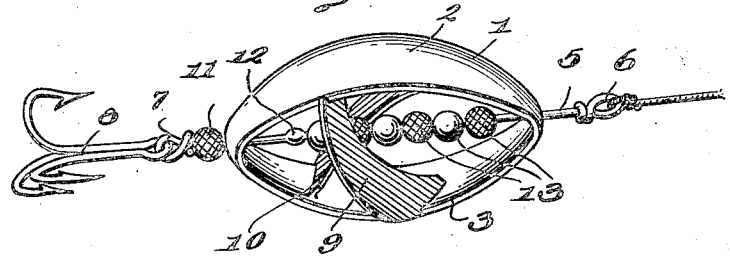
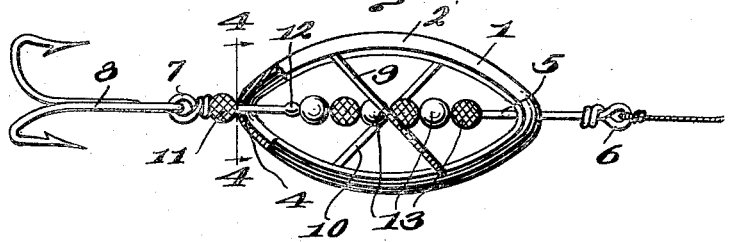
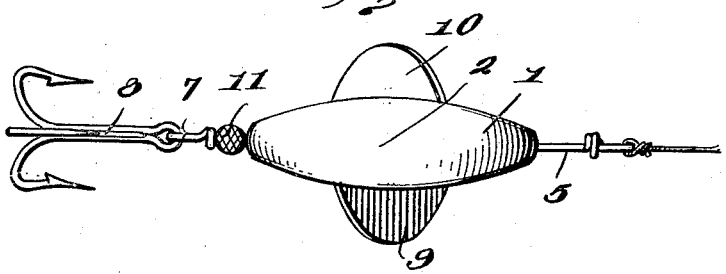
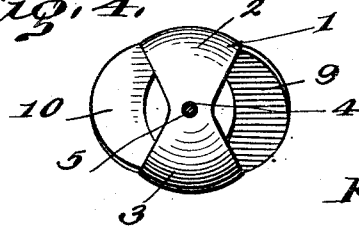
INVENTOR
Frank L. Koepke
BY
ATTORNEYS

1,530,835

UNITED STATES PATENT OFFICE.

FRANK L. KOEPKE, OF RIDGEFIELD, WASHINGTON.

FISH LURE.

Application filed October 17, 1923. Serial No. 669,124.

*To all whom it may concern:*

Be it known that I, FRANK L. KOEPKE, a citizen of the United States, and resident of Ridgefield, in the county of Clarke and State of Washington, have invented certain new and useful Improvements in Fish Lures, of which the following is a specification.

My invention relates to improvements in fish lures, and it consists in the combinations, constructions and arrangements herein described and claimed.

An object of the invention is to provide a fish lure which is adapted to be associated with a hook and which when moved through the water will rotate or spin about its axis, thereby attracting fish.

A further object of the invention is to provide a fish lure of the character described which is of simplified construction and capable of being manufactured at a low cost.

Other objects and advantages will be apparent from the following description, considered in conjunction with the accompanying drawings, in which—

Figure 1 is a perspective view showing a lure embodying the invention attached to a plurality of hooks, Figures 2 and 3 respectively are a side elevation and a plan view of the apparatus which is exhibited in Figure 1, and Figure 4 is a section along the line 4—4 of Figure 2.

In carrying out my invention, I provide a frame 1 which preferably is made of a light gauge metal and is elliptical in cross sectional contour. The frame thus comprises side portions designated 2 and 3 respectively which are merged one into the other at their opposite ends, each of the side portions having the outer face thereof convexly curved from one longitudinal edge to the other longitudinal edge and each side portion preferably decreasing in width from its transverse median line toward its opposite end, whereby resistance of the frame to movement thereof through the water in a manner to be hereinafter described will be relatively slight.

The frame 1 is provided at its opposite ends or in other words at the junctures of the side portions thereof with each other with openings such as that indicated at 4 in Figure 2, which openings are located at opposite ends of the major axis of the frame and in axial alignment with each other. A wire 5 extends loosely through the openings at the ends of the frame so that the frame may rotate freely on the wire about the axis of the latter. The wire 5 is provided at its opposite ends with eye portions or loops 6 and 7 respectively which serve as stops for limiting the movement of the frame longitudinally of the wire and also provide means whereby the wire may be attached at one end to a fishing line, not shown, and at its other end to the shanks of hooks 8. The sides 2 and 3 of the frame are connected together by a pair of vanes or screw blades which are indicated respectively at 9 and 10. Each of the vanes comprises a substantially crescent-shaped strip of thin gauge metal and may be twisted or bent slightly about its longitudinal axis from one end thereof to its other end if desired. Each vane is of such length as to extend from a point on the inner face of one of the sides of the frame located approximately midway between the transverse median line of the side and one end of the latter to a point on the inner face of the other side of the frame located approximately midway between the transverse median line of the second side and the opposite end of the second side.

As stated, each of the vanes is substantially crescent-shaped, both the inner and outer edges thereof being arcuately curved and the outer edge thereof coinciding with the arc of a circle which is struck by a radius of less length than the radius by means of which the arc coinciding with the inner edge of the same is struck. The vanes are secured in any suitable known manner to the inner faces of the sides of the frame and the intermediate portion of each vane extends laterally of the frame, the respective vanes extending laterally of opposite sides of the frame, as best seen in Figures 3 and 4. The general planes of the respective vanes extend obliquely to the longitudinal or major axis of the frame 1 and substantially at right angles to each other, the arrangement being such that the plane which extends transversely through the frame 1 midway between the ends of the latter also extends through both of the vanes at a point on each vane midway between the opposite ends of that vane.

From the foregoing description of the various parts of the device, the operation thereof may be readily understood. When the device is moved through the water in the direction of length of the wire 5, the action of the water on the vanes 9 and 10 will cause the frame 1 to spin or revolve about the axis of the wire 5, thereby attracting fish. When the device is lowered in the water, the same will be rotated in one direction and when the device is raised in the water or drawn toward the operator, the direction of rotation of the frame will be reversed.

The device is therefore well adapted for use in fishing operations in which the line is moved vertically as for instance by lowering and raising the line through an opening cut in ice on a body of water. Since the frame will be rotated as soon as the device is moved forcibly into contact with the water, it will be obvious that the device is well adapted for use in casting and trolling. The frame 1 or the vanes 9 and 10 or both may be colored as desired to make more striking the resemblance of the lure to a live bait and the coloring at opposite ends of the frame may be of such that reversal of the frame will cause the lure to resemble two different live objects of the same general description selectively.

It will be observed by reference to Figure 4 that the curvature of the outer faces of the sides 2 and 3 between their side edges and the spacing of the intermediate portions of these side portions of the frame are such that a circle struck about the major axis of the frame as a center by a link extending radially from the major axis of the frame to the outer face of either of the side portions of the frame midway between the ends of the latter will have as portions thereof arcs substantially coincident with the outer edges of the vanes. The device therefore is adapted to be moved in the direction of its length through the water with but relatively little resistance.

A bearing bead 11 may be disposed on the wire 5 between the loop or eye 7 and the adjacent end of the frame 1. A stop 12 may be provided on the wire 5 for limiting the movement of the frame along the wire 5 away from the bead 11, toward the loop or eye 6. Additional beads 13 may be placed on the wire 5 between the stop 12 and the remote end of the frame. The frame 1 will thus be mounted to rotate without any appreciable friction. The blades may be of any suitable and desirable shape and size and the respective beads may be of the same or different colors. Also, the beads may be of variegated or solid colors so as to be attractive to fish. For example, adjacent beads may be of contrasting colors and the beads may be fashioned in the similitude of insects or other natural food of the fish.

Obviously, my invention is susceptible of embodiment in forms other than that which has been disclosed in the foregoing and I therefore consider as my own all modifications and adaptations of the form of the device herein disclosed which fairly fall within the scope of the appended claims.

I claim:—

1. A fish lure comprising an open frame substantially elliptical in cross sectional contour and having an opening at each end thereof, the openings at the opposite ends of the frame being located at opposite ends of the major axis of the frame, a wire extending loosely through said openings and being adapted at one end for connection with the shank of a fish hook and at its other end for connection with a fishing line, a pair of vanes carried by the frame, the respective vanes extending laterally of opposite sides of the frame, and each being joined at its opposite ends immediately to the sides of the frame at adjacent lateral edges of the latter said vanes being disposed in relation to the frame so that the general plane of each vane extends obliquely to the direction of length of the major axis of the frame.

2. A fish lure comprising an open frame substantially elliptical in cross sectional contour and having an opening at each end thereof, the openings at the opposite ends of the frame being located at opposite ends of the major axis of the frame, a wire extending loosely through said openings and being adapted at one end for connection with the shank of a fish hook and at its other end for connection with the fishing line, a pair of vanes carried by the frame, the respective vanes extending laterally of opposite sides of the frame and each being joined at its opposite ends immediately to the sides of the frame at adjacent lateral edges of the latter, said vanes being disposed in relation to the frame so that the general plane of each vane extends obliquely to the direction of length of the major axis of the frame, and the general plane of each vane intersects the general plane of the other vane substantially at right angles and in the plane of the minor axis of the frame, and also at a point on each vane midway between the ends of that vane.

3. A fish lure comprising an open frame substantially elliptical in cross sectional contour, thus providing a pair of side portions which merge into each other at their opposite ends, the outer face of each side portion being convexly curved between its side edges and the curvature of the outer faces of both side portions being uniform, means whereby the frame may be supported for rotation about its major axis, and a pair of vanes extending between the side portions of the frame, the respective vanes extending laterally of opposite sides of the frame, and each being joined at its opposite ends immediately to the sides of the frame at adjacent lateral edges of the latter and the outer edge of each vane being arcuately curved and being substantially flush at the points at which it is joined to the side portions of the frame with the adjacent portions of the outer faces of said side portions.

FRANK L. KOEPKE.